United States Patent Office 3,021,335
Patented Feb. 13, 1962

3,021,335
METHOD FOR THE PRODUCTION OF
ISOXAZOLIDONES
Andor Fürst, Basel, and Emilio Kyburz, Riehen, Switzerland, assignors to Hoffmann-La Roche Inc., Nutley, N.J., a corporation of New Jersey
No Drawing. Filed Apr. 9, 1959, Ser. No. 805,124
Claims priority, application Switzerland Apr. 26, 1958
8 Claims. (Cl. 260—307)

This invention relates to a method for the production of isoxazolidones. In particular, the invention relates to a method for the production of isoxazolidones represented by the following structural formula

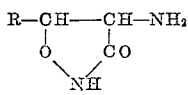

I wherein R represents hydrogen or lower alkyl.

The novel method for producing compounds of Formula I, in its broad aspect, comprises treating an ethylenimine carboxylic acid ester having the general formula

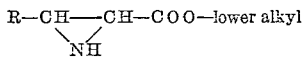

II wherein R represents hydrogen or lower alkyl, with a strong acid in a solvent, then treating the reaction product with hydroxylamine and a strong base in the presence of water and isolating the product. The starting material may be obtained by reacting the appropriately substituted α-bromo-α,β-unsaturated carboxylic acid or a derivative thereof with ammonia according to the method described in copending application Serial No. 768,847, filed October 22, 1958. The lower alkyl group in either Formula I or Formula II may be a straight chain or branched chain aliphatic hydrocarbon group such as methyl, ethyl, propyl, isopropyl, butyl, isobutyl, sec.-butyl, t-butyl, amyl, isoamyl, hexyl, heptyl and the like. The O-lower alkyl group in Formula II is the residue of a lower aliphatic alcohol which may be a primary, secondary or tertiary alcohol. Isopropoxy is preferred as the O-alkyl radical.

The reaction of the ethylenimine compound of Formula II with a strong acid in a solvent normally produces a mixture of the salts of an α-anion substituted-β-amino acid ester and β-anion substituted-α-amino acid ester with the former predominating. It is preferable, however, to obtain the latter, since that is the only one of the two products which cyclizes to the isoxazolidone desired. It has now been found that the reaction will produce primarily the β-anion substituted-α-amino acid ester salt if the O-lower alkyl group of formula II is derived from a secondary or tertiary alcohol. If, however, the alkyl group is the residue of a primary alcohol, the same result may be achieved through use of a polar solvent.

In the first stage of the process the ethylenimine compound of formula II is treated with a strong acid, e.g. a mineral acid, preferably a hydrohalic acid such as hydrochloric acid, hydrobromic acid, or with methanesulfonic acid, etc. The solvent used for this reaction may be any solvent inert to the reaction conditions, for example, water, chloroform, methylene chloride, tetrachloromethane, ethylene chloride, trichloroethylene, methanol, ethanol, benzene, light petrol, nitromethane and the like. When the O-lower alkyl group is the residue of a primary alcohol and a polar solvent is required for the desired isomeric reaction product to predominate, polar solvents such as water, methanol, alcohol, chloroform, may be utilized. Water is preferred. This reaction step should preferably be carried out at room temperature or below, e.g. between about —10° and 30° C. It has also been found that the mixture of isomers obtained as product of the reaction need not be separated but may be directly treated with hydroxylamine in the next step of the process as described below. It is, however, advisable to isolate the β-anion substituted-α-amino carboxylic acid ester salt from the mixture of isomers prior to the treatment with hydroxylamine. This can advantageously be effected by fractional crystallisation, e.g. from acetone, chloroform, methylene chloride or from mixtures, such as chloroform-ethylacetate, methanol-ethylacetate, ethanol-ether, at a temperature between 20° and —10° C.

For the second step of the process the mixture of α-anion substituted-β-amino acid ester and β-anion substituted-α-amino acid ester salts is reacted with a slight excess of hydroxylamine in a strong base and in the presence of a fivefold amount of water. Bases such as the alkali metal hydroxides, e.g. sodium hydroxide, etc. may be used. A tenfold amount of water may be used if at the same time methanol is added to the mixture. The reaction temperature should not exceed —15° C.

The process described above lends itself to the ready isolation of the isoxazolidone product in aqueous solution in pure form. By adjusting the pH of the reaction mixture from the second step of the process within the range of about 7.5 to 9, e.g. with an acid such as acetic acid, the byproducts precipitate out while the isoxazolidone remains in solution and may be separated by filtration. The clear filtrate containing the product need only be acidified, e.g. to about pH 6, in order for the isoxazolidone to precipitate out and be recovered in highly pure state.

The following examples are illustrative of the invention. All temperatures are stated in degrees centigrade.

*Example 1*

4.60 g. of ethylenimine-2-carboxylic acid ethyl ester were slowly added to 10 ml. of 38% hydrochloric acid at 0° with stirring. After stirring for 15 minutes at 0°, the mixture was poured into 20 ml. of alcohol and concentrated at 30° in vacuo. The oily residue was dissolved several times in alcohol and again evaporated to dryness. The residue was permitted to stand overnight under high vacuum and in the presence of solid sodium hydroxide, whereupon the oil solidified. Yield 7.55 g.

The solid product was titrated according to the method of Cromwell, J.A.C.S. 70 (1948), 1320, in the following manner: 100 mg. of the mixture were dissolved in 10 ml. of acetone-alcohol (1:1), treated with 0.6 ml. of 3 N alcoholic hydrochloric acid and then boiled overnight with 16 ml. of 0.2 N potassium iodide solution in acetone-alcohol (1:1). The liberated iodine was then triturated with 0.03 N sodium thiosulfate solution. 1 ml. of this solution corresponds to 2.82 mg. of α-chloro-β-aminopropionic acid ethyl ester hydrochloride. From this result it was determined that the product contained 38% α-chloro-β-aminopropionic acid ethyl ester hydrochloride and by inference 62% α-amino-β-chloropropionic acid ethyl ester hydrochloride.

6.43 g. of sodium hydroxide were dissolved in 40 ml. of water, cooled to —15° with stirring and treated with 3.35 g. of finely pulverized hydroxylamine hydrochloride. The temperature rose to —10° but was then cooled again to —15°. 7.52 g. of the mixture of α-chloro-β-aminopropionic acid ethyl ester hydrochloride and α-amino-β-chloropropionic acid ethyl ester hydrochloride obtained as described above was introduced portionwise into the solution over a period of 20 minutes so that the temperature remained between —14 and —15°. The mixture was stirred for an additional 30 minutes at —5°, then for one hour at 0° and finally for one hour at 30°. 21 ml. of 1 N sodium hydroxide solution were then added to the reaction mixture and the clear solution was concentrated in vacuo at 50° to a weight of 18 g. The residue was shaken with 60 ml. of methanol, the precipitated sodium chloride was filtered under suction and washed three times with 10 ml. portions of warm methanol (50°). The filtrate was then cooled to −17°. Glacial acetic acid was carefully added over a period of 30 minutes with stirring. At pH 9 the solution became turbid and at pH 7.5 a precipitate formed which was filtered under suction. The precipitate contained no isoxazolidone since a test reaction with sodium nitroferricyanide was negative. The filtrate was then adjusted to pH 6 with 3.8 ml. of glacial acetic acid whereupon cycloserine precipitated. The mixture was stirred for an additional 2½ hours at −17°. The cycloserine was then filtered off, washed with 10 ml. of methanol, cooled to −17° and dried in vacuo at 50°, M.P. 131° (with dec.); yield. 1.38 g.=34% of theory; purity: 97.4%; pure yield: 33%.

*Example 2*

82 g. of α,β-dibromopropionic acid isopropyl ester were dropped over the course of 1¼ hours into 1.2 liters of liquid ammonia which contained 0.8 g. of N-phenyl-β-naphthylamine stabilizer. The mixture was stirred for an additional 3 hours and then the ammonia was evaporated in vacuo. The solid residue was taken up in 500 ml. of ether and 200 ml. of saturated sodium chloride solution. The aqueous solution was extracted twice with 500 ml. portions of ether. The combined ether extracts were dried with sodium sulfate, filtered and the filtrate was concentrated in vacuo. Distillation of the oily residue yielded ethylenimine-2-carboxylic acid isopropyl ester, B.P. 52–53°/11 mm., $n_D^{20}$=1.4350.

9 g. of ethylenimine-2-carboxylic acid isopropyl ester were dissolved in 10 ml. of water. The solution was slowly dropped into 17 ml. of 37.5% hydrochloric acid solution which was maintained at −8°. The solution was stirred for 2 hours at −10° and an additional hour at 0°. The mixture was then poured into ½ liter of isopropanol and concentrated in vacuo. 13.9 g. of a crystalline mixture was obtained which contained 37% of α-chloro-β-aminopropionic acid isopropyl ester hydrochloride when titrated as described in Example 1.

8.1 g. of the mixture were treated with hydroxylamine in sodium hydroxide solution as described in Example 1. By filtering at pH 8.2, 1.5 g. of impurities were separated. At pH 6.0, 0.7 g. of pure cycloserine (29% of theory) were then obtained. (The mother liquors still contained additional quantities of cycloserine.)

*Example 3*

300 ml. of absolute chloroform were saturated at room temperature with hydrogen chloride. While continuing to introduce a steady light stream of hydrogen chloride, a solution of 9 g. of ethylenimine-2-carboxylic acid isopropyl ester and 40 ml. of chloroform were slowly dropped in over a period of about 50 minutes. After 4½ hours the stream of hydrogen chloride was discontinued. The solution was stirred for an additional 12 hours. After concentration in vacuo, 14.6 g. of a white crystalline residue remained which contained 28% α-chloro-β-aminopropionic acid isopropyl ester hydrochloride and the remainder α-amino-β-chloropropionic acid isopropyl ester as determined by titrating according ot the procedure described in Example 1.

8.1 g. of the mixture were treated with hydroxylamine in sodium hydroxide solution according to the procedure described in Example 1. 1.8 g. of cycloserine were obtained, purity: 95.6%. Yield of pure cycloserine based on the α-amino-β-chloropropionic acid ester hydrochloride present in the mixture: 68%.

*Example 4*

9 g. of ethylenimine-2-carboxylic acid isopropyl ester were dissolved in 300 ml. of benzene. A weak stream of hydrogen chloride was then introduced. The temperature fluctuated between 20–25°. After 5 hours the white suspension was concentrated. 13.7 g. of a dry product containing 28% α-chloro-β-aminopropionic acid isopropyl ester hydrochloride was obtained.

7.7 g. of the mixture thus obtained were treated with hydroxylamine in sodium hydroxide solution according to the procedure described in Example 1. The yield of cycloserine was 30% of theory.

*Example 5*

500 g. of α,β-dibromopropionic acid isopropyl ester were introduced dropwise, within 1½ hours, into 7300 ml. of liquid ammonia, while stirring. After 3 hours, the mixture was concentrated and the residue taken up in 1220 ml. of methylene chloride, filtered and rinsed with 1220 ml. of methylene chloride. The filtrate containing the ethylenimine-2-carboxylic acid isopropyl ester was concentrated in vacuo to a volume of one liter and the ammonium bromide that precipitated was filtered off. The filtrate was then added dropwise, over a period of 40 minutes, to 3300 ml. of methylene chloride (previously saturated with hydrogen chloride) while introducing a steady stream of hydrogen chloride. The solution was stirred for one hour, whereupon the stream of hydrogen chloride was stopped. The reaction mixture was allowed to stand for a few hours, then concentrated in vacuo at 40°. The residue was taken up with 1100 ml. of acetone and, after stirring for 15 minutes, cooled to 0°. After 2 hours the crystallized α-amino-β-chloropropionic acid isopropyl ester hydrochloride formed was sucked off and washed with 500 ml. of acetone (previously cooled to 0°). The solid residue was dried at 50°, M.P. 135° (with dec.).

188 g. of α-amino-β-chloropropionic acid isopropyl ester hydrochloride were dissolved in a mixture of 77.5 g. of hydroxylamine hydrochloride, 695 ml. of water and 235 ml. of methanol. The solution was cooled to −10°. 147 g. of sodium hydroxide were dissolved in 348 ml. of water and added dropwise, over a period of 40 minutes, to said solution while stirring and keeping the temperature at −15°. The mixture was stirred for an additional half hour at −15°, then for one hour at 0° and, finally, for one hour at 30°. 19.6 g. of sodium hydroxide in 480 ml. of water were added to the reaction mixture and the resulting solution was concentrated in vacuo at 50° to a weight of 435 g. The sodium chloride was precipitated by the addition of 1400 ml. of methanol, filtered off and rinsed with 700 ml. of methanol. The filtrate was cooled to −17° and the pH adjusted to 5.9–6.0 by means of glacial acetic acid. After stirring for 2½ hours at −17° the precipitate was filtered off and washed with 1100 ml. of methanol (previously cooled to −17°). The DL-cycloserine thus obtained was dried in vacuo at 50–60°, M.P. 137°.

*Example 6*

41 g. of α,β-dibromopropionic acid isopropyl ester were added within 30 minutes, while stirring, to 500 ml. of liquid ammonia containing 5 ml. of water and 6.4 g. of phenyl-β-naphthylamine as stabilizer. The mixture was further stirred for 2½ hours and concentrated in vacuo for one hour. The residue was taken up with 300 ml. of chloroform and 100 ml. of saturated sodium chloride solution. The sodium chloride solution was twice extracted with 300 ml. of chloroform. The combined chloroform extracts were washed with 50 ml. of saturated sodium chloride solution, dried with sodium sulfate and concentrated to a volume of 100 ml. The solution obtained contained ethylenimine carboxylic acid isopropyl ester which was not isolated. This solution was then added dropwise, during one hour, to 700 ml. of chloroform (previously saturated with hydrogen chloride), while introducing a steady stream of hydrogen chloride into the solution. The inflow of hydrogen chloride was maintained for one additional hour. Then, the reaction mixture obtained was allowed to stand for a few hours and concentrated to a weight of 150 g. After adding 40 ml. of ethyl acetate, the solution was seeded with α-amino-β-chloropropionic acid isopropyl ester hydrochloride and allowed to stand for 3 hours at 0°. The crystallized precipitate was filtered off and washed with 20 ml. of ethyl acetate. The resulting α-amino-β-chloropropionic acid isopropyl ester hydrochloride was treated with hydroxylamine in sodium hydroxide solution according to the procedure described in Example 5 to produce cycloserine.

We claim:
1. A method for the preparation of isoxazolidone compounds having the general formula

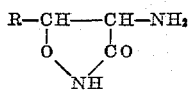

wherein R represents a member of the group consisting of hydrogen and lower alkyl, which comprises treating an ethylenimine-2-carboxylic acid ester having the general formula

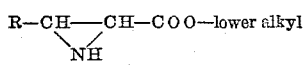

wherein R is the same as above, with a strong acid in a solvent, treating the reaction product with hydroxylamine and a strong base in the presence of water and isolating the isoxazolidone compound obtained.

2. A method according to claim 1 wherein the starting material is ethylenimine-2-carboxylic acid ethyl ester and the solvent is water.

3. A method according to claim 1 wherein the starting material is ethylenimine-2-carboxylic acid isopropyl ester.

4. A method according to claim 1 wherein the strong acid is hydrochloric acid.

5. A method which comprises reacting ethylenimine-2-carboxylic acid ethyl ester with aqueous hydrochloric acid and reacting the product with hydroxylamine in aqueous sodium hydroxide.

6. A method which comprises reacting ethylenimine-2-carboxylic acid isopropyl ester with hydrochloric acid and reacting the product with hydroxylamine in aqueous sodium hydroxide.

7. A method which comprises reacting ethylenimine-2-carboxylic acid lower alkyl ester with a strong acid in a solvent, reacting the product with hydroxylamine in aqueous alkali metal hydroxide, adjusting the pH of the resulting reaction mixture within the range of about 7.5 to 9, filtering off the precipitated material and acidifying the filtrate to precipitate cycloserine.

8. A method which comprises reacting ethylenimine-2-carboxylic acid lower alkyl ester with a strong acid in a solvent, isolating the β-anion substituted-α-aminocarboxylic acid lower alkyl ester from the reaction product obtained by fractional crystallization and reacting said ester with hydroxylamine and a strong base in the presence of water.

References Cited in the file of this patent

UNITED STATES PATENTS 2,943,092   Smrt et al. _____ June 28, 1960
2,958,691   Smrt et al. _____ Nov. 1, 1960

OTHER REFERENCES

Smrt et al.: Chemical Abstracts, vol. 51, column 14683–5 (1957).

Smrt et al.: Chemical Abstracts, vol. 51, column 17888 (1957).

Smrt et al.: Chemical Abstracts, vol. 52, column 11272 (1958).